STANLEY W. EHRLICH
MARK MACKLES
GREGORY C. BANIKIOTES
INVENTORS.

BY Jules E. Goldberg
AGENT

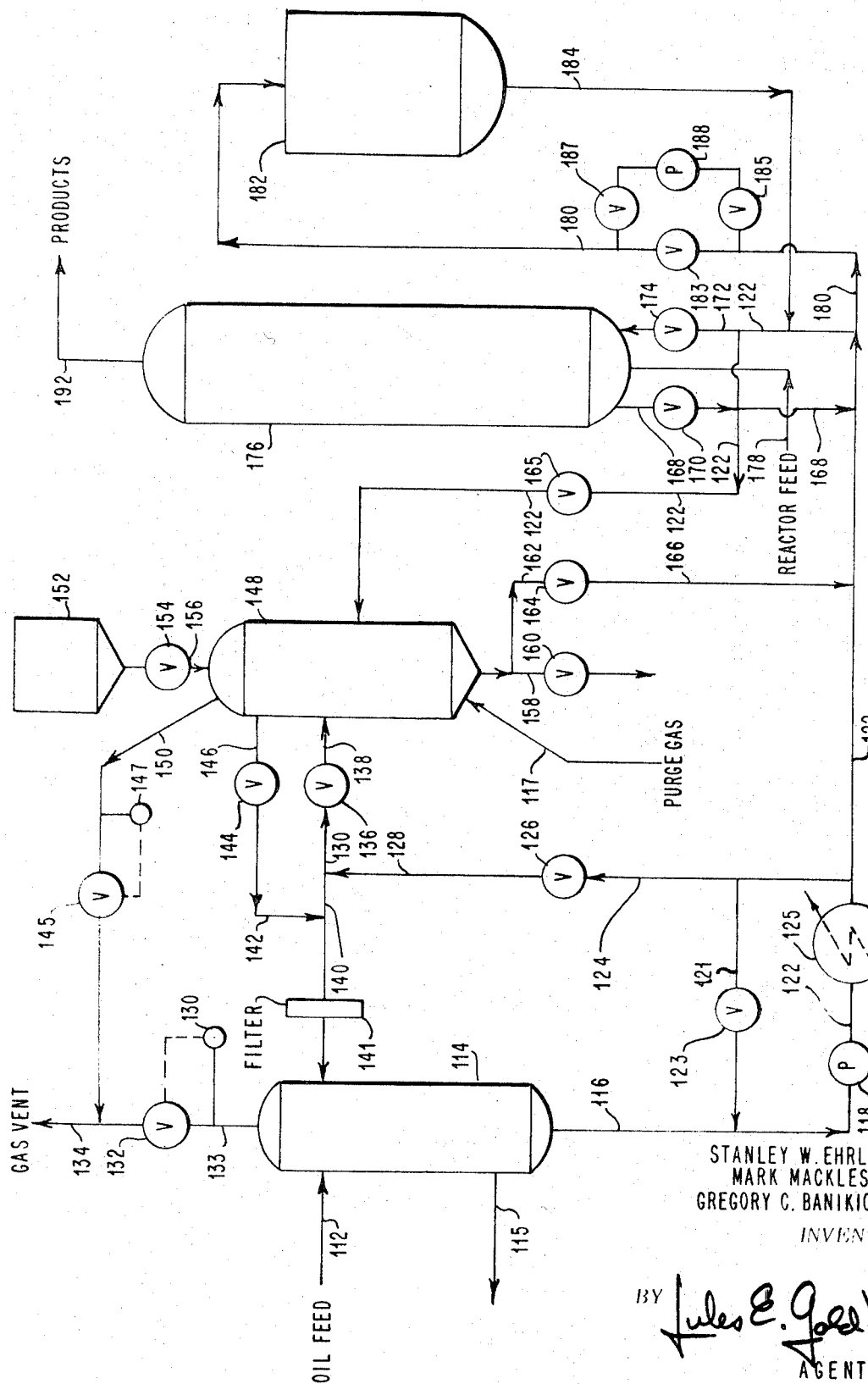

3,547,809
SOLIDS ADDITION AND WITHDRAWAL PROCESS
Stanley W. Ehrlich, Far Rockaway, and Gregory C. Banikiotes, Seaford, N.Y., and Mark Mackles, London, England, assignors to Hydrocarbon Research, Inc., New York, N.Y., a corporation of New Jersey
Filed Aug. 19, 1968, Ser. No. 753,403
Int. Cl. C10g 23/10
U.S. Cl. 208—143                                                5 Claims

ABSTRACT OF THE DISCLOSURE

A process for the addition and withdrawal of solids from a high pressure reaction vessel by using a pressurized liquid transfer medium, which is compatible with the reactor liquid and removing the transferred solids from the transfer medium and recycling the transfer medium for re-use.

BACKGROUND OF THE INVENTION

This invention pertains to the field of particulate solid addition and withdrawal from high pressure reaction zones. More particularly, it pertains to the addition and removal of particulate catalyst or contact materials to zones where high pressure contacting of gaseous and liquid reactants with said solids takes place.

In various catalytic reactors and similar reaction systems, it is usually necessary from time to time to introduce a particulate solid, which may be a catalyst, to the reactor and, in due course, to remove the solid from the reactor. In fixed bed contacting systems, the addition and withdrawal of solids during the on-stream time of the reactor has not been feasible. With the advent, however, of the upflow reactor, such as disclosed in U.S. Pat. Re. 25,770, and other types of counter-current reaction systems, the addition and withdrawal of catalyst from the pressurized reaction zone has become an important factor with respect to the advantages of such systems.

In general, it is the normal procedure to first, build up a solids inventory in the reactor by a high addition rate and after the desired solids level has been reached, to decrease the addition rate and to withdraw the solids from the zone at a rate equivalent to the addition rate, such that the inventory within the reaction zone remains constant. Thus, it is possible in such systems to continuously replenish the contact material, although from time to time, it may be desired to completely replace the catalyst in the reaction vessel.

Numerous problems have developed with respect to such addition and withdrawal systems. A major requirement for such addition and withdrawal is that since the reaction zones are at relatively high pressures, usually in excess of 1000 p.s.i.g., the catalyst addition system must be pressurized such that the material within the reaction zone does not blow out through the addition or withdrawal system. High pressure systems of this type have, therefore, required the development of suitable valving, conduit and pumping means in order to maintain the required pressure. Additional hazards also exist since, usually, the contacting gases are highly inflammable, particularly in hydrogenation reactions.

Two basic mechanisms have been developed for such addition and withdrawal systems. The first is the use of gas transfer systems. These may be either of the plug flow or the dilute phase transfer type. In plug flow, the particulate solid is essentially tightly packed within the transfer conduit leading into or from the reaction vessel. A pressurized gas is then used to force the mass of solids along the transfer piping. The usual problem associated with such gas-driven plug flow systems, is that the high slippage between the solids material and the gas results in excessive plugging of the lines with little or no movement of the solids through the system. The gas, of course, usually flows through the interstitial spacing between the particles of the solid.

The dilute phase method uses a high volume of gas with a relatively small amount of solids. The gases, at relatively high velocities, blow the solids along the transfer piping into or away from the reaction vessel. The major problem associated with the dilute phase system is the high rate of particulate solid attrition which results from the extremely rough treatment which the particles receive as they come in contact with the conduit walls and other particles.

Additionally, both gas systems discussed above, have several disadvantages in common, such as the high gas volume requirement for a given amount of solids transfer and the incompatibility of the gaseous transfer agent with the reactants within the vessel. Because of such incompatibility, it is usual in such cases to remove the vapor transfer agents just prior to introducing the solids to the vessel.

Liquid type transfer systems of the slurry type are also well known in the art. Such methods normally include mixing or slurrying the solid to be added in the liquid and then pumping the slurry using a slurry pump to the reactor. The basic disadvantage of such slurry systems is that the tortuous path which the solids go through as they traverse through the pump results in severe attrition of the catalyst. In addition, slurry pumps usually create numerous mechanical difficulties, including the relatively poor feed control which is normally attendant to their use.

Particular catalyst problems have arisen as a result of the use of the upflow, ebullated contacting system, in that it is critical in such systems, that the particulate contact material be of a relatively narrow size range. Thus, attrition of the catalyst due to the method of introduction and withdrawal could result in severe operating difficulties in the system.

SUMMARY OF THE INVENTION

We have discovered a method whereby a particulate solid material may be added to or withdrawn from a high pressure reaction vessel using relatively low transfer medium volumes and without suffering from line pluggage and severe catalyst attrition. More particularly, we have found that by opening the high pressure reaction vessel into fluid contact with a circulating liquid transport stream, said stream being at a somewhat lower pressure than the reaction zone, the particulate solid within the reaction zone along with some reaction zone liquid will flow into and with the circulating stream. The circulating stream may then be led to a suitable withdrawal zone where the particulate solid is removed from the liquid transport medium, either by settling, filtration, centrifugation, etc. The circulating medium may then be withdrawn from the zone and used to transport additional catalyst. We have discovered that such a system results in numerous advantages over those systems known or used heretofore.

Particularly, we have found that while the rate of catalyst withdrawal with our invention is comparable with those obtained using the slurry methods known in the art, the attrition rate of the catalyst is significantly decreased and, thus, the use of our invention gives substantially better and more gentle handling of the particulate solids.

The basic difference between our invention and those slurry processes mentioned previously, is that the solids are transported by the liquid as a result of the pressure applied on the liquid to move it through the transfer piping of the system. The liquid without particulate solid material is pumped by normal type reciprocating pumps. The particulate matter, therefore, never contacts the pump. It is removed in the withdrawal zone and only the solids free liquid transport medium is recycled to the pump for repressurization.

Additional advantages of our system reside in the fact that at any time the contact between the reaction system and the circulating liquid stream may be broken and a solids free liquid stream may then be recirculated through the entire liquid transport system, so as to clear all piping and valving means from any residual particulate solids. As a result, the valving means that may be used can be of a simple mechanical nature and upon termination of particulate solids transfer, the liquid transfer medium may be used to cleanse the valves such that the valves can be closed upon a clean liquid. Such cleansing recirculation also minimizes pipe pluggage.

Our invention also has numerous advantages over the vapor transfer systems described above. Particularly, the use of a liquid transfer medium gives much higher rates of solids transfer with respect to the volume of transport medium required. In the case where a high concentration of solids exists in the liquid transfer medium, the slippage between the liquid and the solids is sufficiently small such that plugging is minimized. Additionally, the liquid transfer medium gives superior handling of the solids with respect to the mechanical attrition problem. With a liquid phase transport system, mechanical attrition is significantly decreased over that which is normally attendant to gas transport methods.

An additional advantage of the liquid transport system is that a liquid which is compatible with the liquid in the reaction system may be used. Therefore, there is no necessity for complex piping and valving equipment just prior to the solids entrance to the reaction system, since the transport medium may be directly introduced along with the solids to the reaction system.

Thus, we have discovered a method which allows one to take advantage of the desirable aspects of liquid phase transport system without the attendant disadvantages of the mechanical requirements of slurry pumps and high rates of mechanical attrition of the particulate solids.

DESCRIPTION OF THE DRAWINGS

FIG. 2 is a schematic diagram of a particulate solids addition and withdrawal system.

DESCRIPTION OF THE PREFERRED EMBODIMENT

Figure 1:
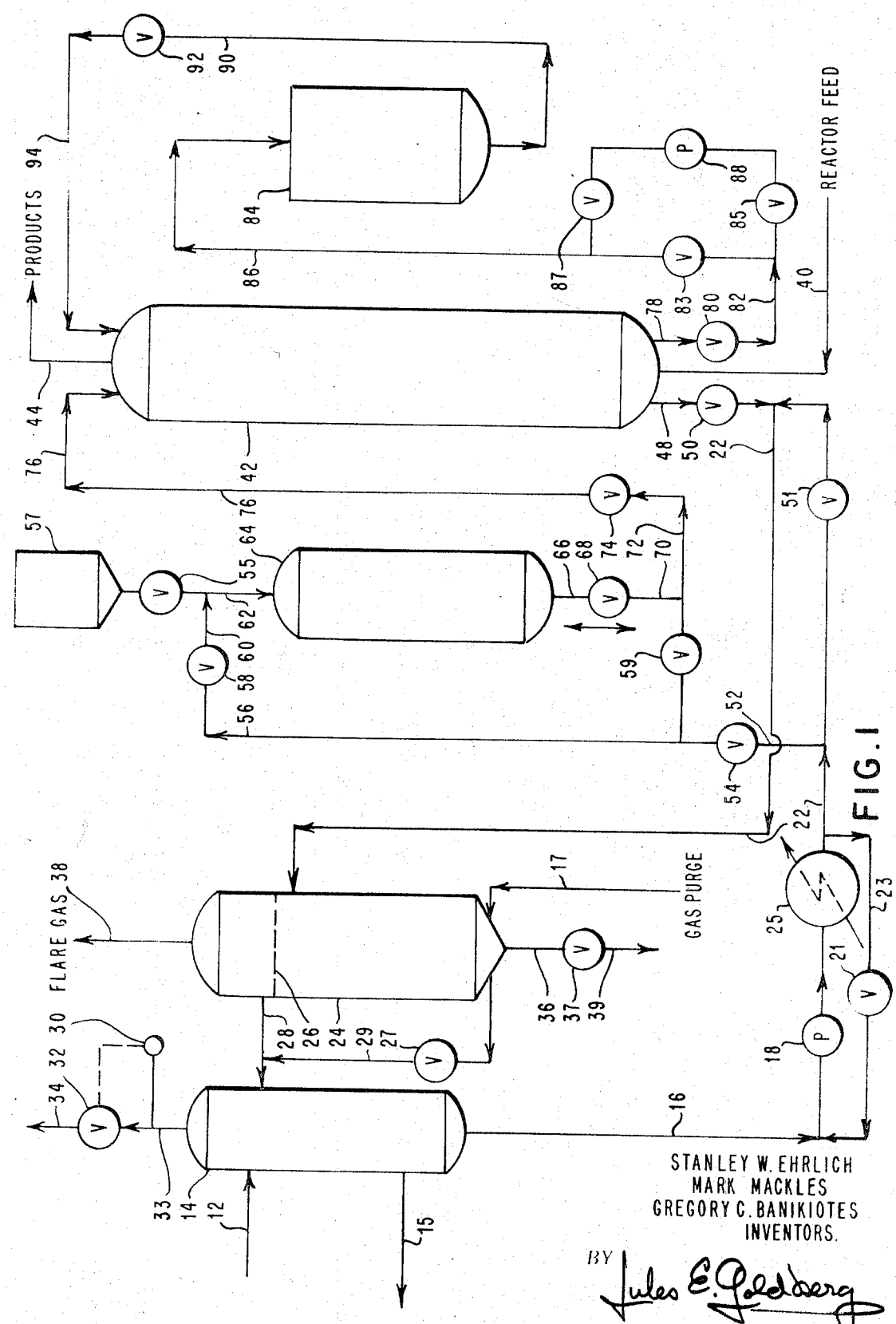
FIG. 1 is a schematic diagram of a particulate solids addition and withdrawal system.

Our invention is applicable to a broad variety of processes which require the addition and removal of a particulate solids material to high pressure reaction systems. Generally, such reaction systems are considered to be reaction vessels containing a particulate contacting agent which may or may not have catalytic activity and wherein a liquid feed is passed through the system usually along with a gaseous reactant at high temperatures and pressures. It is entirely possible that the contacting system may be of either the fixed or ebullated bed type. The particular nature of the reaction system is not critical to the invention. Additionally, it is immaterial whether the catalyst is added or withdrawn from the top or bottom of the reaction system, although in the drawings described herein, both modes are disclosed.

FIG. 1 is a schematic flow diagram of a solids addition and withdrawal process, wherein the withdrawal zone is separate from the solids addition zone. The operational steps utilized are as follows:

PARTICULATE SOLIDS WITHDRAWAL

A transfer liquid feed in 12 is introduced to pressure pot 14. The liquid feed may be any of a number of liquids which would be compatible with that liquid in the reaction system. In the case shown, the liquid is considered to be an oil. The liquid is removed from pressure pot 14 through line 16 and is pumped by pump 18 through cooler 25, line 22 and valve 51, into the solids withdrawal zone 24. The atmospheric gases have previously been purged from withdrawal zone 24 using a gas purge from line 17.

Withdrawal zone 24 contains a filter means 26 which is located between the entrance at line 22 and the clean oil exit at line 28. The filter means may be any type of a screen or a filtration device which would be effective in removing the particulate solid from the transfer liquid such that the liquid exiting the zone through line 28 would be solids free.

The liquid transfer medium completely fills zone 24 and exits through line 28 back into the pressure pot 14. The pumping is continued until the entire system, thus described, is completely full of the liquid transfer medium. If desired, at any time during this operation, or during subsequent addition or solids withdrawal operations through line 36, valve 37 and line 39, the liquid transfer medium may bypass both the pressure pot and the withdrawal zone, simply by opening valve 21 and recycling the liquid from pump 18 through line 23 back into line 16. Also, this bypass circuit allows improved control over the total liquid flow.

The pumping is continued until the desired pressure for solids withdrawal from reaction zone 42 has been reached. This pressure is dependent on the exact rate of solids withdrawal desired and also on the pressure within reaction zone 42. In any case, it would always be lower than the reaction zone pressure. The differential pressure desired is regulated through pressure regulating valve 32. In pressure pot 14 there exists in the very upper level, a gaseous phase which normally results from waste and product gases from the reaction zone and from vaporization of any liquid, either in the feed or products in the reaction zone or some of the transfer medium itself. The pressure in line 33 is measured by sensing device 30 and valve 32 automatically opens and closes to maintain the desired pressure. Thus, it is possible to not only vent the waste gases through line 33 through valve 32 and line 34, but also to control the overall pressure of the liquid transfer system within the desired limits.

Upon reaching the desired pressure level, valve 50 may be opened and the particulate solids in the reaction liquid medium will flow through line 48 and valve 50 into transfer line 22. The driving force for this flow results from the differential pressure between the reaction zone and the liquid transfer medium. It is understood that the particulate solids constitute a mixed slurry within the reactor liquid and thus a minimum of said reactor liquid is introduced into line 22. There is, however, a continuous build-up of the reactor liquid in the liquid transfer system and it eventually becomes necessary to clean the liquid transfer system of said reactor liquid. This is easily accomplished by recycle and exiting of the liquid through a clean liquid transfer medium purge. Periodically, it becomes necessary to exit liquid from the system through exit 15, since the added reactor liquid increases the total liquid inventory of the system.

An important advantage of this system now becomes apparent in that the solids from reaction zone 42 are usually at a relatively high temperature and upon coming in contact with the cooled liquid transfer agent, a quenching effect is obtained. This results in substantially easier handling of the solids in addition to the reduction of the safety hazard due to the lower temperature involved. The exact quenching effect derived depends, of course, on the reaction zone temperatures and the temperature of the liquid transfer medium.

The withdrawn solids are then carried by the liquid transfer medium through line 22 and into withdrawal zone 24, where settling of the solids takes place. The liquid transfer medium is continually passed through filter means 26 and the solids free transfer medium is withdrawn from withdrawal zone 24 through line 28 back into the pressure pot for recycling. It is noted that in reactor 42, the feed material enters through line 40 and the products are removed at the top through line 44. Thus, an equilibrium with respect to material removal and feed addition within the reactor is maintained during the particulate solids withdrawal operation. For shutdown, oil may be drained from zone 24 through line 29 and valve 27.

Also shown in a subordinate solids holding system for use when it becomes necessary to temporarily shut down the reaction system. This holding system allows withdrawal of the particulate solids whereby they may be retained in a holding zone during a scheduled shutdown of the system when high pressures and temperatures are no problem. Particularly, it is shown that the solids may be removed from reaction zone 42 by gravity flow through line 78 and valve 80 and introduced through line 82 through valve 83 to a holding pot 84. When it is desired to re-introduce these solids back into the reaction zone, valve 83 is closed and valves 85, 87 and 92 are opened. Oil from reactor 42 is then pumped by pump 88 through line 86 and zone 84. The solids and oil in zone 84 are thereby transferred through line 90, valve 92 and line 94 back to the reactor 42.

SOLIDS ADDITION

A unique feature of our invention lies in the fact that the same circulating liquid transport medium may be used for the addition of particulate solids to the reactor. A particular embodiment of this addition process is shown in FIG. 1 as follows:

The particulate solid material in overhead bin 57 is introduced through valve 55 and line 62 to the solids addition zone 64.

Valves 54, 59 and 68 are then opened, valves 58 and 74 remaining closed. The solids addition zone 64 is filled with liquid transfer medium through lines 22 and 52 thereby purging the zone of gases through valve 55. After zone 64 is full of liquid, valve 58 is opened and lines 56 and 60 are filled with liquid. Valve 55 is then closed and the system is pressuized to a pressure somewhat greater than that in reaction zone 42.

After pressurization, valves 59 and 58 may be adjusted such that the proportionate flows through each are different. The particular settings are easily obtained by experiment. Valve 74 is then open and the solids are transported with the liquid transport medium from zone 64 through line 66, valve 68, line 70 and line 72, valve 74 and line 76 into the reaction zone 42.

After all of the particulate solids have been transferred, pumping may be continued for a time sufficient to cleanse all transfer piping and valve system of any residual particulate solids. The system is then closed off from the reaction system proper.

FIG. 2 is a schematic flow diagram of a solids addition and removal process wherein the separate solids addition zone and solids withdrawal zone described in FIG. 1 are combined. In such a modification, the reactor 176 is a high pressure reaction vessel in which a feed material is added through line 178 and products are removed through line 192. The reaction is carried out at high temperatures and pressures and within the reactor there exists a solid contacting material in a liquid phase. There may also be gaseous reactants and products, depending on the nature of the reaction system.

SOLIDS WITHDRAWAL PROCESS

The liquid system is first purged of all atmospheric gases by introducing the liquid transport media through line 112 and into pressure zone 114. It is then pumped through line 116 by pump 118 into line 122 and cooled in cooler 125. A portion of the liquid media in line 122 then enters line 124, and line 128 through valve 126. It is further recirculated back to pressure zone 114 through line 140 and filter 141. A bypass circuit consisting of line 123, valve 121 is provided for improved flow control.

A second portion of the liquid transport media continues through line 122, through valve 165 and enters holding zone 148, which has previously been purged of atmospheric gases by a purged gas through line 117. This system is completely filled with liquid by exiting any residual gases through line 150. The liquid transport media then exits holding zone 148 through line 146, valve 144 and line 142, where it is combined with the recirculating stream in line 140.

After the system has been completely filled with the liquid transport media, pumping is continued so as to pressurize the system to a pressure slightly less than that within reaction zone 176. After this pressure level has been obtained, valve 170 is opened and the particulate solids in the reactor liquid flow through line 168 and valve 170 into recirculating stream 122. The recirculating stream carries the solids into holding zone 148 where they are deposited by settling. Any gases that build up in zone 148 may be released through line 150; the pressure in zone 148 being controlled by valve 145 and pressure controller 147. The clarified liquid in the top of zone 148 is removed through line 146, valve 144 and line 142. It is, thereby, carried into line 140 and through filter means 141. As previously described, filter means may be any type of device, screen, etc., which would effect a complete removal of the particular size solids being used. Thus, the clarified liquid transport medium which re-enters pressure zone 145 contains essentially no particulate solids.

When the desired amount of solids have been removed, valve 170 is closed and at proper intervals, the system may be depressurized by using pressure control means 130 in connection with pressure control valve 132 in lines 133 and 134 after which the solids retained in holding zone 148 are removed through line 158 and valve 160 to an external disposal source.

As noted, heretofore, there will be a gradual build up of reactor liquid in the liquid phase transport system. Thus, it will become necessary from time to time to completely flush the liquid transport system so as to remove any contaminated material. Also, excess transfer liquid may be removed from the system through exit line 115.

CATALYST ADDITION

The addition of the particulate solid to the reactor in the process shown in FIG. 2 is carried out as follows:

The particulate solids are introduced from hopper 152 through valve 154 and line 156 into the holding zone 148. This zone may then be purged of atmospheric gases using gas purge line 117. With valve 154 opened, the liquid transport medium is circulated in the manner described above, from pressure zone 114 through line 116 and pump 118 upwardly through line 124 and valve 126. Valve 165 is closed so that no transport medium enters zone 148 through line 122. The transport medium is then introduced to holding zone 148 through line 128, 130, valve 136 and line 138. In this manner, the system is completely filled with the transport media. Valve 154 is then closed and any remaining purged gas in the system is removed through line 150. Liquid transport medium may be recycled through lines 146 and valve 144 and line 142.

After the system is completely filled with the liquid transport medium, it is pressurized to a pressure slightly greater than that of reaction zone 176. Valves 164 and 174 are then opened and with continued pumping, the particulate solids are transferred from zone 148 through line 162, valve 164 and line 166 into transfer line 122. The transport medium and the solids then proceed to line 172 and valve 174 into the reaction zone 176. Transport is continued until all of the solids have been transferred from zone 148 to the reaction zone. Circulation of the transport medium may be continued for a period in order to remove residual solids and then all valves are closed on a clean liquid system. The liquid transport system is then easily depressurized through the valve means provided.

Additionally, FIG. 2 also shows a solids holding tank 182 whereby the solids may be removed from the reaction zone and then returned after repairs or shutdown operations.

In this case, valves 170 and 183 are opened and valve 165 is closed. The solids then flow by gravity through lines 168, 122 and 180 into holding zone 182. When it is desired to return the solids to the reactor 176, valves 183 and 170 are closed and valves 185 and 187 are opened. Pump 188 then pumps oil through line 180 into zone 182 thereby transferring the solids from zone 182 back to the reaction zone 176 through lines 184, 122, 172 and valve 174.

Thus, broadly, our invention consists of a process for addition or withdrawal of a particulate solid material from a high pressure reaction zone which contains a first liquid material in addition to the particulate solid at high temperatures and pressures. The reaction zone is brought into fluid contact with a liquid transfer system which contains a second liquid which is compatible with the first liquid in the reaction zone. The liquid system is at a higher or lower pressure than the liquid in the reaction zone depending on whether it is desired to add or withdraw solids from said reaction zone. In the case of withdrawal, the pressure of the liquid transfer system is lower than that in the reaction zone such that the particulate solids along with some of the first liquid flow into the circulating stream of the liquid transfer system. The solids in the liquid transfer system are then removed through a withdrawal zone wherein they are separated from the liquid and from which the solids free liquid is removed and recirculated for additional use as the transfer medium.

In the case of addition of a particulate solid, the liquid system is at a higher pressure than that in the reaction zone and the liquid transport medium is circulated, first through a solids holding zone and then through appropriate transfer piping to the reaction zone whereby the solids are transferred from the holding zone to the reaction zone.

In each case, it is to be noted that at no time does a slurry of particulate solids in the liquid contact any pumping means. The pumps always operate on a solids free liquid.

Also, because of the excellent control of addition and withdrawal rates that can be obtained with our invention, these operations may be carried out very slowly such that for all practical purposes, the operation is continuous. This aspect is particularly important in temperature dependent reaction, since in such a case, the addition of a relatively cold contact material at too high a rate could terminate the reaction.

Although the above discussion discloses a preferred mode of embodiment of our invention which is particularly applicable to the hydrogenation of liquid hydrocarbons wherein each of the liquids is a liquid hydrocarbon, it is recognized that from such disclosure, many modifications will be obvious to those skilled in the art and it is understood, therefore, that our invention is not limited to only those specific methods, steps or combination or sequence of method steps described, but covers all equivalent steps or methods that may fall within the scope of the appended claims.

We claim:
1. A process for withdrawing a particulate solid contained in a first liquid hydrocarbon material from a high pressure reaction zone for the hydrogenation of liquid hydrocarbons which comprises:
   (a) opening the reaction zone into fluid contact with a liquid system containing a second hydrocarbon liquid, said second liquid hydrocarbon being compatible with said first liquid hydrocarbon and being at a lesser pressure than the first liquid hydrocarbon and;
   (b) continuously flowing said second liquid past the point of fluid contact whereby the solids with some of said first liquid flow into said system and are carried away from said point;
   (c) separating the second liquid from the solids contained therein and;
   (d) returning the separated second liquid to the system;
   (e) and closing off the reaction zone from said fluid contact after the desired amount of solids material has been removed.

2. The process as claimed in claim 1 wherein said liquid system is composed of a liquid pressurizing zone and a catalyst withdrawal zone and which further includes the steps of:
   (a) purging atmospheric gases from the liquid system and then;
   (b) filling the liquid system with said second liquid and then;
   (c) pressuring the liquid system to a pressure somewhat less than that of the reaction vessel by continuously pumping the second liquid into the system and then;
   (d) continuously recirculating the second liquid through the system and then;
   (e) opening the contents of the reaction vessel into fluid contact with the recirculating second liquid stream whereby the solids are transferred to and carried by said second liquid and;
   (f) continuously introducing the carried solids into said withdrawal zone and;
   (g) separating the second and any first liquid contained therein from the solids in the withdrawal zone and;
   (h) closing off the withdrawal zone from said system after the desired amount of solids have been retained in the withdrawal zone and then;
   (i) depressurizing the withdrawal zone and then;
   (j) removing solids from the withdrawal zone.

3. The process as claimed in claim 2 wherein the recirculating second liquid stream is cooled prior to coming into fluid contact with the contents of the reaction vessel whereby said contents are cooled by said contact.

4. The process of claim 1 wherein an average inventory of particulate solids is maintained in the high pressure reaction zone without substantial pressure drop which further includes the steps of:
   (a) introducing the particulate solids to a solids holding zone which is open to the atmosphere and contains atmospheric gases therein and then;
   (b) purging the solids holding zone of gases by pumping a carrier oil therethrough;
   (c) sealing the solids holding zone from the atmosphere and then;
   (d) pressurizing the solids holding zone to above the pressure of the reaction zone by pumping oil into the solids holding zone and then;
   (e) transferring the particulate solids in liquid phase transport to the reaction zone by exiting oil from the solids holding zone and introducing it to the reaction zone.

5. The process as claimed in claim 4 wherein the rates of solids addition to and withdrawal from the reaction zone are controlled by the respective pressure differentials between the reaction zone and the carrier oil.

References Cited

UNITED STATES PATENTS

| | | | |
|---|---|---|---|
| 3,079,329 | 2/1963 | Browning | 208—157 |
| 3,227,528 | 1/1966 | Jaeger | 23—289 |
| 3,295,897 | 1/1967 | Erickson et al. | 302—66 |
| 3,398,085 | 8/1968 | Engle | 208—143 |
| 3,410,792 | 11/1968 | Van Driesen et al. | 208—143 |
| 3,443,837 | 5/1969 | Meyer et al. | 302—66 |

HERBERT LEVINE, Primary Examiner

U.S. Cl. X.R.

23—289; 208—157, 176; 302—14